(12) United States Patent
Mühlemann

(10) Patent No.: US 10,647,040 B2
(45) Date of Patent: *May 12, 2020

(54) CO-INJECTION NOZZLE COMPRISING INTEGRATED BACK-FLOW BARRIER

(71) Applicant: FOSTAG Formenbau AG, Stein am Rhein (CH)

(72) Inventor: Rolf Mühlemann, Schlattingen (CH)

(73) Assignee: FOSTAG Formenbau AG, Stein am Rhein (CH)

( * ) Notice: Subject to any disclaimer, the term of this patent is extended or adjusted under 35 U.S.C. 154(b) by 202 days.

This patent is subject to a terminal disclaimer.

(21) Appl. No.: 15/524,795

(22) PCT Filed: Sep. 22, 2015

(86) PCT No.: PCT/EP2015/071667
§ 371 (c)(1),
(2) Date: May 5, 2017

(87) PCT Pub. No.: WO2016/071035
PCT Pub. Date: May 12, 2016

(65) Prior Publication Data
US 2017/0312961 A1    Nov. 2, 2017

(30) Foreign Application Priority Data
Nov. 6, 2014   (CH) .................................. 1714/14

(51) Int. Cl.
*B29C 45/23* (2006.01)
*B29C 45/16* (2006.01)
(Continued)

(52) U.S. Cl.
CPC ............ *B29C 45/231* (2013.01); *B29C 45/13* (2013.01); *B29C 45/1603* (2013.01);
(Continued)

(58) Field of Classification Search
CPC ... B29C 45/231; B29C 45/13; B29C 45/1642; B29C 45/1603; B29C 45/1604; B29C 45/164; B29C 45/1607
See application file for complete search history.

(56) References Cited

U.S. PATENT DOCUMENTS

| | | | |
|---|---|---|---|
| 4,657,496 A | 4/1987 | Ozeki et al. | |
| 6,270,703 B1 * | 8/2001 | Wildman | ............... B01D 29/33 264/39 |

(Continued)

FOREIGN PATENT DOCUMENTS

| | | |
|---|---|---|
| AT | 391833 B | 12/1990 |
| EP | 0901896 A2 | 3/1999 |

(Continued)

OTHER PUBLICATIONS

Braun P: "Zwei Komponenten Zentral Angespritzp", Plastverarbeiter, Huethig GMBH, vol. 49, No. 10, Oct. 1, 1998, 4 pages, Formenbau.

(Continued)

*Primary Examiner* — Michael M. Robinson
(74) *Attorney, Agent, or Firm* — Paul D. Bianco; Gary S. Winer; Fleit Intellectual Property Law

(57) ABSTRACT

A co-injection nozzle for an injection moulding device for producing multi-layered injection-moulded products. The nozzle includes: a central bore; a valve needle for opening and closing a nozzle opening; an annular inner melt channel for the first melt; an annular central melt channel for a second melt; and an annular outer melt channel for the first melt. The inner, central and outer melt channels are fluidically combined in the region of the nozzle tip to form a concentrically-layered melt stream. The co-injection nozzle has a back-flow barrier, integrated into the central bore, for the second melt, this barrier formed by a cut-out in the valve needle and by a melt channel for the second melt, the channel penetrating the central bore. In the open position of (Continued)

the back-flow barrier, the cut-out is located such that the second melt can flow through the melt channel, whilst flowing in the central bore past the valve needle.

12 Claims, 4 Drawing Sheets

(51) Int. Cl.
  *B29C 45/13* (2006.01)
  *B29L 31/00* (2006.01)

(52) U.S. Cl.
  CPC ...... *B29C 45/1642* (2013.01); *B29C 45/1607* (2013.01); *B29C 2045/1648* (2013.01); *B29K 2995/0067* (2013.01); *B29L 2031/712* (2013.01); *B29L 2031/7148* (2013.01)

(56) References Cited

U.S. PATENT DOCUMENTS

| | | |
|---|---|---|
| 2004/0247739 A1 | 12/2004 | Sabin et al. |
| 2010/0007048 A1 | 1/2010 | Schweininger et al. |
| 2011/0108505 A1* | 5/2011 | Toyoda .................. B29B 11/14 215/12.2 |
| 2013/0207289 A1* | 8/2013 | Babin ................. B29C 45/1603 264/40.1 |

FOREIGN PATENT DOCUMENTS

| | | |
|---|---|---|
| EP | 0911134 A2 | 4/1999 |
| EP | 0929390 A1 | 7/1999 |
| EP | 2054209 A1 | 5/2009 |
| EP | 2781330 A1 | 9/2014 |
| JP | H07156202 A | 6/1995 |
| JP | 2010012605 A | 1/2010 |
| WO | 8100231 A1 | 2/1981 |
| WO | 0054955 A1 | 9/2000 |
| WO | 2004103668 A2 | 12/2004 |
| WO | 2011006999 A1 | 1/2011 |
| WO | 2012037682 A2 | 3/2012 |

OTHER PUBLICATIONS

International Preliminary Report on Patentability dated May 9, 2017 for PCT/EP2015/071667 filed Sep. 22, 2015.
Written Opinion for PCT/EP2015/071667 filed Sep. 22, 2015.
International Preliminary Report on Patentability dated May 9, 2017 for PCT/EP2015/071668 filed Sep. 22, 2015.
Written Opinion for PCT/EP2015/071668 filed Sep. 22, 2015.
International Search Report dated Dec. 11, 2015 for PCT/EP2015/071667 filed Sep. 22, 2015.
Written Opinion dated May 12, 2016 for PCT/EP2015/071667 filed Sep. 22, 2015.

* cited by examiner

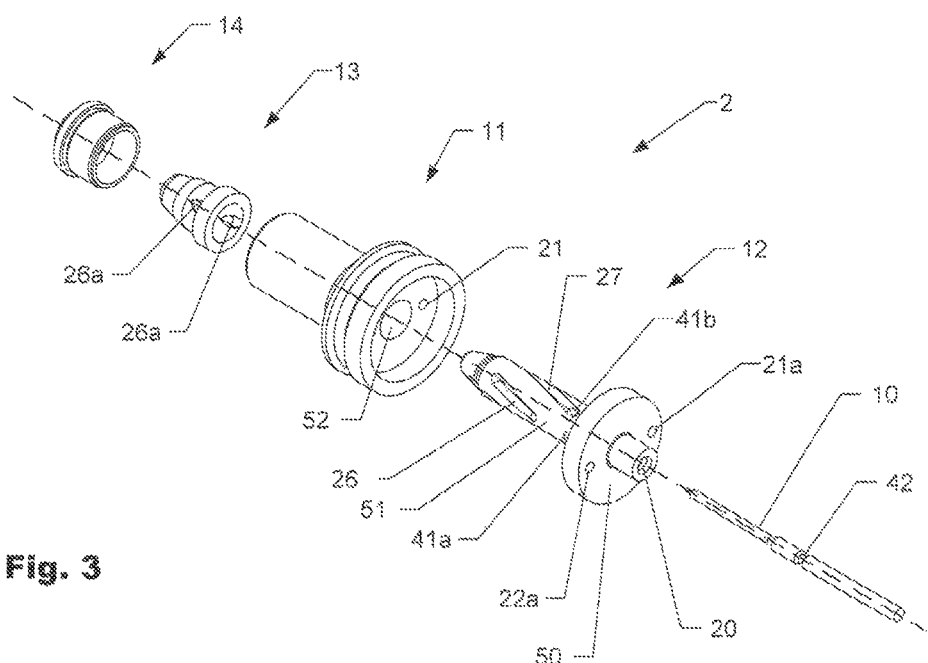
Fig. 3
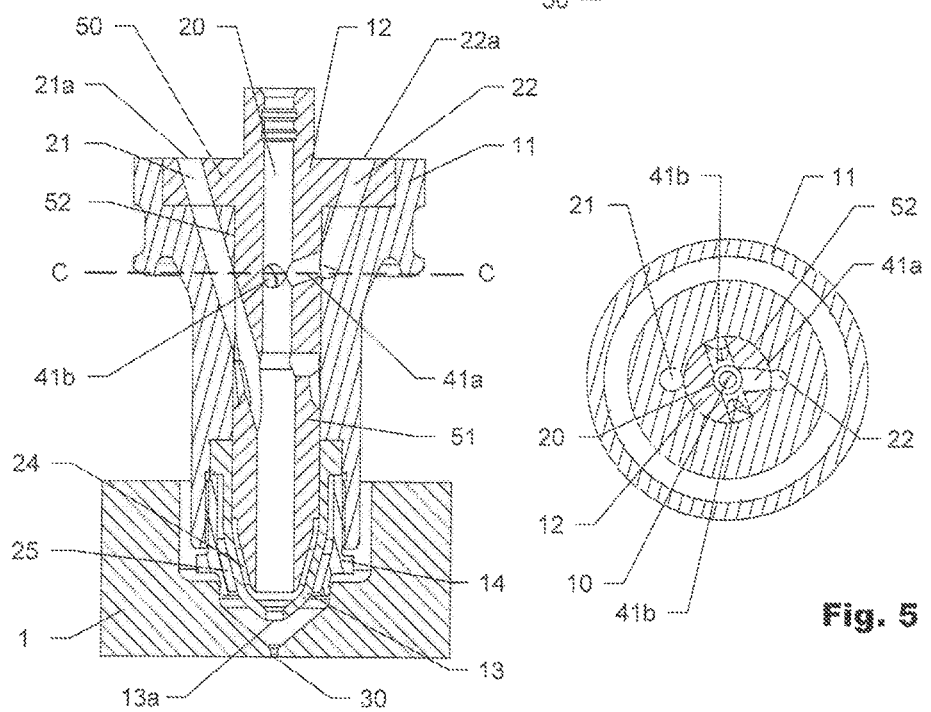
Fig. 4
Fig. 5

CO-INJECTION NOZZLE COMPRISING INTEGRATED BACK-FLOW BARRIER

TECHNICAL FIELD

The invention relates to a co-injection nozzle for a hot runner co-injection device of an injection moulding apparatus for the production of multilayer injection moulded products, in particular injection moulded products with a barrier or sealing layer. Co-injection nozzles of this type comprise an annular inner melt channel which, in the downstream half of the co-injection nozzle, is formed by the central bore and the valve needle and is in fluid communication with a first melt supply channel; an annular middle melt channel which is in fluid communication with a second melt supply channel and which extends about the annular inner melt channel; and an annular outer melt channel which is in fluid communication with the first melt supply channel and which extends about the annular middle melt channel. The inner, middle and outer melt channels are fluidically merged in the region of the nozzle tip in order to form a concentrically layered melt stream.

TECHNICAL BACKGROUND

Co-injection nozzles or hot runner co-injection devices for injection moulding apparatus, with which two different melts can be simultaneously injected through a nozzle orifice into a moulding chamber or cavity of an injection mould, have been known for a long time (for example U.S. Pat. No. 4,657,496). Most older co-injection nozzles have two separate channels for the two melts, which are disposed in a manner such that a two-layered stream of melt is discharged from the nozzle orifice.

For the production of multilayer injection moulded products, in particular protective containers for foodstuffs, pharmaceutical products, blood samples, etc., with what is known as a barrier or sealing layer, a special type of co-injection nozzle is actually used in which the outflow stream is triple-layered and concentrically configured, wherein the barrier layer forms the middle layer.

WO 81/00231 discloses a co-injection nozzle of this type, which combines three separate melt streams in one triple-layered, concentric melt outflow stream. In that nozzle, the inner melt stream can be regulated using a valve needle disposed in a central bore of the nozzle.

In other co-injection nozzles of this basic type, a first melt is divided into two streams outside or inside the co-injection nozzle which then form an inner and outer layer of the concentric outflow stream. A second melt is guided between the two layers and forms the middle barrier layer. The three layers are then combined into a multilayer melt stream outside or inside the co-injection nozzle and then injected into the mould cavity as a concentric outflow stream, whereupon a multilayer injection moulded product is formed with a barrier layer that is covered on both sides. The melts of the various layers can be regulated as a function of the type of embodiment of the co-injection nozzle or the co-injection device. In order to enclose the barrier layer completely in the melt for the outer and inner layer, at the respective start and end of an injection moulding procedure, only the melt for the outer and/or the inner layer is injected, without the melt for the middle layer.

EP 0 929 390 discloses a co-injection nozzle in which the three melt layers are combined in a combination unit disposed upstream of the nozzle and then guided along an elongate tubular flow channel to the nozzle orifice. The tubular flow channel is formed by a central bore in the nozzle body and a valve needle disposed therein. The valve needle can be used to adjust the flow of the inner melt layer in the combination unit. In addition, the flow of the individual melt streams is regulated via the supply unit.

EP 0 911 134 describes a co-injection unit in which three melt streams are guided through a respective melt supply opening into the co-injection nozzle and are combined to form a concentrically layered melt stream in the nozzle tip region shortly before the nozzle orifice. The melt for the inner layer is guided in an annular inner melt channel which is formed by a central bore and a valve needle. The melt for the middle layer is guided in an annular middle melt channel which extends about the annular inner melt channel. The melt for the outer layer is guided in an annular outer melt channel which extends about the annular middle melt channel. The inner and middle melt channels can be closed off by the valve needle while the outer melt channel remains open.

WO 00/54955 discloses a co-injection nozzle in which the two melts for the inner and middle layer are combined in a first upstream combination unit outside the co-injection nozzle and then guided together along an inner central melt channel to the nozzle orifice in order to obtain a combined melt stream which is as stable as possible. In the region of the nozzle tip, the melt for the outer layer is combined with the already combined central melt stream and then injected like this into the mould cavity.

WO 04/103668 discloses a co-injection device in which a first melt stream is divided within a co-injection nozzle into two streams for the inner and outer layer. The divided streams are combined in a combination chamber with the second melt for the middle layer upstream of an elongate central melt channel in order to form a concentrically layered melt stream which then is guided via the central melt channel along a valve needle to the nozzle orifice. The combination chamber is thus configured in a manner such that the formation of the middle layer can be regulated with a minimum amount of material from the two streams of the first melt, avoiding instabilities in the flow.

EP 2 054 209 discloses a co-injection device in which a first melt is divided into two streams upstream of the inlet into the co-injection nozzle. The divided streams are then merged with the second melt in the region of the nozzle tip in order to form a multilayer melt stream.

WO 11/006999 describes a co-injection device in which two melts are supplied laterally of a co-injection nozzle, wherein the first melt is divided within the co-injection nozzle into a stream for the inner and outer layer respectively. The streams are combined in the nozzle tip. The co-injection nozzle has a movable needle and a movable sleeve to regulate the individual melt streams.

WO 12/037682 discloses a co-injection nozzle in which a portion of a first melt stream is guided through an annular second melt stream via lateral tunnel channels. The three melt streams are combined in the region of the tip to form a multilayer melt stream. The inflow of the middle melt stream can be regulated with a movable sleeve.

The material for the barrier layer is expensive, and so in multilayer injection moulded products, it is preferably present in a layer which is as thin as possible. Furthermore, at the start and end of the respective injection moulding cycle, only the first melt is injected and the melt stream for the second melt, which forms the barrier layer, is interrupted in order to obtain an injection moulded product with a completely encapsulated barrier layer. Precise regulation of the second melt is thus desirable in order to produce injection moulded products with very thin barrier layers.

One problem which can occur with known co-injection nozzles, however, is back-flow of the second melt in the middle melt channel. If a back-flow of the second melt of this type occurs, this results in an inaccurate supply of the second melt in the next injection moulding cycle, and thus in inaccurate or defective barrier layers for the injection moulded products.

In the co-injection nozzles of WO 11/006999 and WO 12/037682, back-flow of this type can be prevented by means of a movable sleeve which can close off the annular middle melt channel. Furthermore, the construction of a co-injection nozzle of this type and of the co-injection device is difficult and expensive because of the additional movable parts in the co-injection nozzle.

Other co-injection devices, such as those known from WO 00/54955 or EP 0 901 896, have a back-flow control valve which is disposed outside the co-injection nozzle. EP 0 901 896 in fact concerns a co-injection nozzle with a concentric melt outflow stream with only two layers, wherein back-flow is not so serious, because it is not suitable for the production of injection moulded products with a barrier layer. In WO 00/54955, the back-flow control valve is disposed upstream of the co-injection nozzle in a combination unit between a front melt manifold plate for the first melt and a rear melt manifold plate for the second melt.

The known co-injection nozzles with back-flow control valves—whether they are controlled via a movable sleeve or via an upstream back-flow control valve—are of complex, multi-part construction, which is reflected in the high production and maintenance costs.

In all known co-injection nozzles with triple-layered and concentrically configured outflow streams, division of the first melt and combination of the melts to form a layered stream takes place at least in part outside the co-injection nozzle, or they have a multi-part construction with many complex major components. This is particularly the case when, in addition, a back-flow control valve is provided for the second melt.

DESCRIPTION OF THE INVENTION

An object of the invention is to provide a simple and compactly constructed co-injection nozzle for the production of multilayer injection moulded products with a barrier layer, wherein back-flow of the melt for the barrier layer is prevented and which can be produced and maintained inexpensively.

This object is achieved by means of the features of claim 1. The co-injection nozzle for an injection moulding apparatus for the production of multilayer injection moulded products comprises a first melt supply channel for a first melt and a second melt supply channel for a second melt. The two melt supply channels can simply be connected to a supply device for the respective first and second melts. Furthermore, the co-injection nozzle comprises a central bore; an axially movable valve needle accommodated in the central bore to open and close a nozzle orifice; an annular inner melt channel which is formed in the downstream half of the co-injection nozzle by the central bore and the valve needle and is in fluid communication with the first melt supply channel; an annular middle melt channel which is in fluid communication with the second melt supply channel and which extends about the annular inner melt channel; and an annular outer melt channel which is in fluid communication with the first melt supply channel and which extends about the annular middle melt channel. The inner, middle and outer melt channels converge fluidically in the region of the nozzle tip in order to form a concentrically layered melt stream. The co-injection nozzle furthermore comprises a back-flow barrier for the second melt integrated into the central bore which is formed by a recess in the valve needle and a melt channel for the second melt traversing the central bore, wherein in an open position of the back-flow barrier, the recess is disposed with respect to the traversing melt channel in a manner such that the second melt can flow through the traversing melt channel inasmuch as it can flow in the central bore past the valve needle.

In this manner, the second melt, which is guided in the channel traversing the central bore after being supplied to the co-injection nozzle, can thus flow through the traversing melt channel or not flow through it, as a function of the position of the movable valve needle—which also serves to open and close the nozzle orifice. Thus, the valve needle which is already present in the co-injection nozzle is also used as the back-flow barrier. In this manner, the construction of the co-injection nozzle or co-injection device is simpler and more compact compared with the prior art.

Preferably, the recess and the traversing melt channel are disposed with respect to each other in a manner such that in a first position, the valve needle closes off the nozzle orifice and the traversing melt channel, in a second position it opens the nozzle orifice with the traversing melt channel being closed, and in a third position it opens both the nozzle orifice and the traversing melt channel. In the first position, neither of the two melts can flow. In the second position, only the first melt can flow and the flow of the second melt is blocked. In this manner, back-flow of the second melt is efficiently prevented by back-pressure of the first melt into the middle melt channel. In the third position, which corresponds to the open position of the valve needle mentioned above, the first and the second melts can flow to the nozzle orifice. The recess may be in the form of a constriction, a cross-bore or a circumferential or oblique groove.

Further embodiments of the invention are defined in the dependent claims.

In one embodiment of the co-injection nozzle, the melt channel traversing the central bore places the second melt supply channel in fluid communication with the annular middle channel for the second melt.

Preferably, the traversing melt channel is disposed in the upstream half of the co-injection nozzle, i.e. upstream of the annular inner melt channel.

The melt channel traversing the central bore preferably has an incoming melt channel and at least one outgoing melt channel. The incoming melt channel is in fluid communication with the second melt supply channel. The at least one outgoing melt channel is in fluid communication with the annular middle melt channel. Preferably, the traversing melt channel in the distribution insert is formed by at least one through bore or by a plurality of bores which open laterally into the central bore. The openings of the incoming melt channel and the at least one outgoing melt channel into the central bore may be disposed at approximately the same height in the axial direction.

In one embodiment, the co-injection nozzle comprises a nozzle body with a central bore, in which a cylindrical distribution insert of the co-injection nozzle which is provided with the central bore of the co-injection nozzle is accommodated. Preferably, the traversing melt channel is located in the distribution insert and is formed by at least one through bore or by a plurality of bores opening into the central bore.

In one embodiment, the traversing melt channel is formed by an incoming melt channel and two outgoing melt channels, wherein the incoming melt channel is in fluid communication with the second melt supply channel and the two outgoing melt channels are in fluid communication with the annular middle melt channel via a respective distribution channel. The distribution channels may be formed as grooves incorporated into the surface of the melt distribution insert. This is also possible with just one outgoing melt channel and one distribution channel.

The invention further concerns a co-injection device with at least one co-injection nozzle as described above. In this regard, the co-injection nozzle is held in a nozzle holder plate and accommodated with its tip in a recess of a mould plate.

In one embodiment, regions of the recess in the mould plate may define the annular outer melt channel, wherein the nozzle orifice is formed in the mould plate.

The co-injection device may have a melt manifold plate with a first melt supply line and a second melt supply line, wherein the first melt supply channel of the co-injection nozzle is connected to the first melt supply line and the second melt supply channel of the co-injection nozzle is connected to the second melt supply line.

Preferably, the valve needle of the co-injection nozzle extends in a contact-free manner through a bore in the melt manifold plate and is connected at its upstream end to a valve needle actuation device.

BRIEF DESCRIPTION OF THE FIGURES

The invention will now be explained in more detail, with the aid of exemplary embodiments and with the aid of the accompanying drawings, in which:

FIG. 3 shows an exploded view of a co-injection nozzle;

FIG. 4 shows a sectional view of a co-injection nozzle without a valve needle;

FIG. 5 shows a sectional view of the back-flow barrier;

WAYS OF CARRYING OUT THE INVENTION

Figures 1, 2:
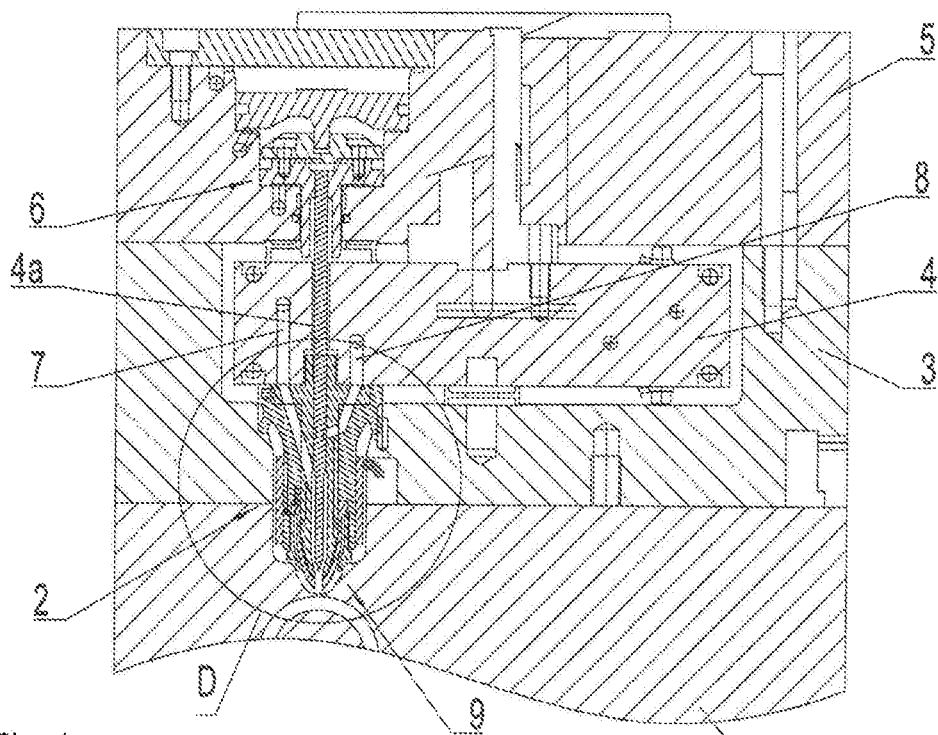
FIG. 1 shows a sectional view of a co-injection device with a co-injection nozzle in an overall view in an injection moulding mould.
FIG. 2 shows an enlarged detailed view of the co-injection nozzle of FIG. 1.

FIG. 1 shows a sectional view of a hot runner co-injection device for the production of multilayer injection moulded products provided with a barrier layer. The co-injection device comprises a mould plate 1 with a recess for a tip 9 of a co-injection nozzle 2. The co-injection nozzle 2 is held in a nozzle holding plate 3. At the side opposite to the tip (i.e. upstream thereof), the co-injection nozzle 2 is provided with a first melt supply opening 21a to supply a first melt A through a first melt supply line 7 and a second melt supply opening 22a to supply a second melt B through a second melt supply line 8. Furthermore, a melt manifold plate 4 is accommodated in the nozzle holding plate 3, which distributes the melts A, B to various co-injection nozzles 2 by means of first and second melt supply lines 7, 8; here, only one co-injection nozzle has been illustrated. Furthermore, a back plate 5 is provided to accommodate the valve needle actuation device 6 for a respective valve needle 10 of the co-injection nozzle 2.

FIG. 2 shows a detailed view of the co-injection nozzle 2 of FIG. 1 (circle D). The co-injection nozzle 2 comprises four concentrically interengaging parts: a nozzle body 11, a melt distribution insert 12, a separating sleeve 13, and a retaining and sealing sleeve 14. The four-part construction (or five-part including the valve needle 10) can also be seen in the exploded view of FIG. 3. The nozzle body 11 may be provided with a heating element 15.

The co-injection nozzle 2 has a central bore 20 which extends axially through the melt distribution insert 12, and in which the valve needle 10 is movably accommodated. In a lower section 20a (i.e. the downstream half 2a of the co-injection nozzle 2), the central bore 20 has a larger diameter than in the upper region 20b (i.e. in the upstream half 2b of the co-injection nozzle 2), so that an annular inner melt channel 23 is formed along the valve needle 10. The valve needle 10 may also be tapered in this region, in order to increase the cross-section of the annular inner melt channel 23. In addition, only the valve needle may be tapered in configuration; the central bore would then have the same diameter over its entire length. Upstream, the annular inner melt channel 23 is in fluid communication with a first melt supply channel 21 for the first melt A. Downstream, it is in fluid communication with a nozzle orifice 30.

In the embodiment shown in FIG. 2, the inner melt channel 23 is tapered in the region of a conically converging tip of the melt distribution insert 12, so that it can be closed by means of the valve needle 10. In order to obtain this type of taper, instead of a melt distribution insert 12 formed in one piece, it may be provided with a screwed-on or firmly welded conical tip.

The melt manifold plate 4 is provided with a bore 4a through which the valve needle 10 extends further, right up to the valve needle actuation device 6. The diameter of the bore 4a of the melt manifold plate 4 which is upstream of the co-injection nozzle 2 is larger than the diameter of the central bore 20 in the upper region 20b, so that the valve needle 10 can be guided in a contact-free manner through the melt manifold plate 4 in order to reduce the conduction of heat via the valve needle 10 into the melt manifold plate 4 and the back plate 5.

The first melt supply channel 21 for the first melt A is connected to the first melt supply line 7 of the co-injection device. A second melt supply channel 22 for the second melt B is connected to the second melt supply line 8 of the co-injection device.

In the co-injection nozzle 2 shown, the first and second melt supply channels 21, 22 are straight and are formed by bores in the nozzle body 11 and in the melt distribution insert 12.

The first melt supply channel 21 for the melt A leads from a first melt supply opening 21a on the upper side of the melt distribution insert 12 to the annular inner melt channel 24. At least one distribution channel 26 (not shown in FIGS. 1 and 2; see FIGS. 3 and 6) for the melt A is in fluid communication with the first melt supply channel 21 and an annular outer channel 25, so that a melt stream A is divided into two streams which are respectively fed into the annular inner melt channel 24 and into the annular outer melt channel 25. These two divided streams of melt form the inner and outer layers of a concentrically layered melt stream which finally passes through the nozzle orifice 30 into a mould cavity 1a of the mould plate 1.

The second melt supply channel 22 for the melt B leads from a second melt supply opening 22a on the upper side of the melt distribution insert 12 to a melt channel 41 traversing the central bore 20 which, together with the valve needle 10, forms a back-flow barrier 40 for the second melt B which is integrated into the central bore 20. In this regard, the movable valve needle 10 in the illustrated co-injection nozzle 2 has a recess 42 in the form of a circumferential groove or constriction. The stream of melt through the traversing melt channel 41 is blocked as a function of the position of the valve needle 10. In an open position of the back-flow barrier 40, the recess 42 is orientated so as to be in communication with the traversing melt channel 41, so that the melt B can flow round the valve needle 10 in the central bore 20. In a closed position which is displaced in the longitudinal direction of the valve needle 10, the traversing melt channel 41 is completely closed off by the valve needle 10. The traversing melt channel 41 is in downstream fluid communication, via at least one distribution channel 27 (not shown in FIGS. 1 and 2; see FIGS. 3 and 6), with an annular middle melt channel 24 which extends between the annular inner melt channel 23 and the annular outer melt channel 25.

Figure 8A:
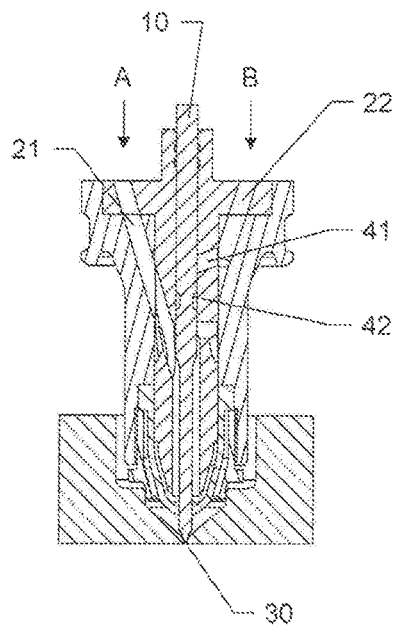
FIGS. 8 (a) to (c) respectively show a sectional view of the co-injection nozzle with three different positions of the valve needle.
Figure 8B:
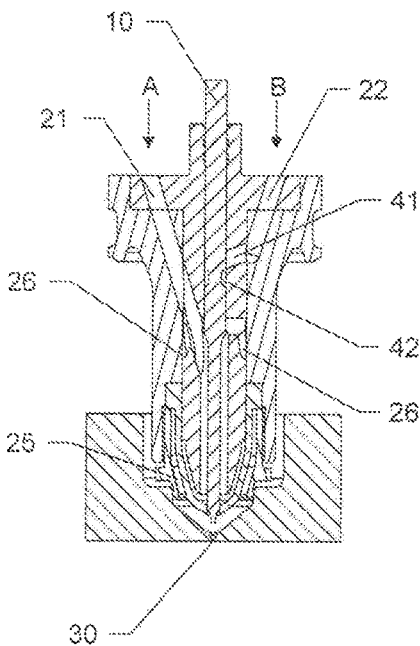
Figure 8C:
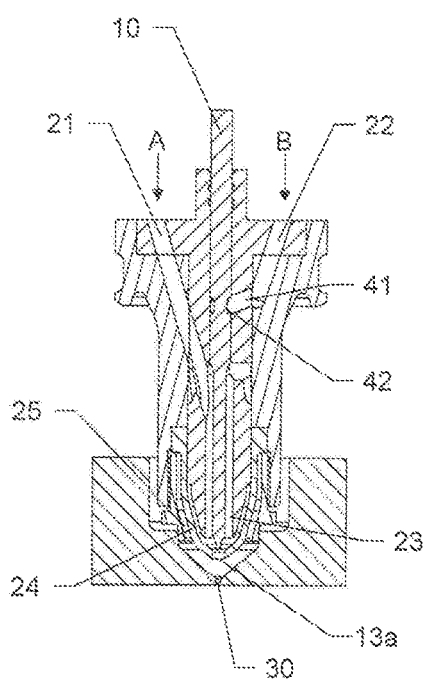

The recess 42 and the traversing melt channel 41 are therefore disposed relative to each other in a manner such that in a first position, the valve needle 10 closes off the nozzle orifice 30 and the traversing melt channel 41 (see FIG. 8(a)), in a second position the nozzle orifice 30 is open, while the traversing melt channel 41 is closed (see FIG. 8(b)), and in a third position both the nozzle orifice 30 and the traversing melt channel 41 are open (see FIG. 8(c)). In the first position, neither of the two melts A, B can flow. In the second position, only the first melt A can flow and the flow of the second melt B is blocked. In addition herein, a back-flow of the second melt B is efficiently prevented by back-pressure of the first melt A into the middle melt channel 24. In the third position, which corresponds to the open position of the valve needle 10 mentioned above, the first and the second melts A, B can flow to the nozzle orifice 30. The recess 42 may be in the form of a constriction, a cross-bore or a circumferential or oblique groove.

In order to form the annular middle melt channel 24 and the annular outer melt channel 25, the co-injection nozzle 2 is provided with the separating sleeve 13 which, in the co-injection nozzle 2 shown, converges conically in the downstream direction. The inwardly orientated surface forms a portion of the middle melt channel 24, and the outwardly orientated surface 25a forms a portion of the outer melt channel 25. The inner melt channel 24 is also formed by a portion of the outer surface 24a of the melt distribution insert 12. Furthermore, the outer melt channel 25 is formed by a portion of an inner surface of the retaining and sealing sleeve 14 which on the one hand fixes the separating sleeve 13 in the co-injection nozzle 2, and on the other hand seals the tip 9 of the co-injection nozzle 2 against the recess in the mould plate 1, so that the tip 9 of the co-injection nozzle 2 or the outer surface 25a of the separating sleeve 13 and a portion of the recess of the mould plate 1 form a front melt chamber or respectively a portion of the annular outer melt channel 25.

In the region of the nozzle tip 9, the annular inner, middle and outer melt channels 23, 24, 25 converge in order to form a concentrically layered stream of melt which can finally be discharged through the nozzle orifice 30 into the mould cavity 1a of the mould plate 1. The nozzle orifice 30 can be opened or respectively closed with the movable valve needle 10, which is provided with a tapering tip in the embodiment shown. The mould plate 1 together with the nozzle tip 9 of the co-injection nozzle 2 thus form a kind of front nozzle chamber from which the melts A, B exit through the nozzle orifice 30, which latter can be closed by the valve needle, into a mould cavity 1a of the mould plate 1.

FIG. 3 shows an exploded view of the co-injection nozzle 2 comprising the five components: valve needle 10 (only the front region which is in the co-injection nozzle is shown), nozzle body 11, melt distribution insert 12, separating sleeve 13 and retaining and sealing sleeve 14. FIG. 4 shows a sectional view of the co-injection nozzle 2 of FIG. 3 in the assembled form without the valve needle and with a mould plate 1 shown in diagrammatic form.

The valve needle 10 (FIG. 3) is provided with a front tapering section (in the downstream half 2a) which, together with the central bore 20 in the melt distribution insert 12, forms the annular inner melt channel 23. Upstream (in the region of the half 2b), the valve needle 10 has a circumferential groove or constriction 42.

The melt distribution insert 12 with the central bore 20 has an upstream flange 50 with the first melt supply opening 21a and the second melt supply opening 22a. These openings form the inlet respectively to the first and second melt supply channels 21, 22. A rod-shaped or circular cylinder-shaped section 51 of the melt distribution insert 12 downstream of the flange 50 is accommodated in a central bore 52 of the nozzle body 11. At the grooves formed in the sleeve surface of the section 51, distribution channels 26, 27 are formed for the melts A, B which place the melt supply channels 21, 22 in fluid communication with the annular outer and annular middle melt channels 25, 24. The distribution channels 26, 27 in this regard are partially closed by the inner wall of the central bore 52 in the nozzle body 11. In the upper region of the section 51 of the melt distribution insert 12 is an incoming melt channel 41a and one of the two outgoing melt channels 41b of the melt channel 41 traversing the central bore 20. The incoming melt channel 41a is in fluid communication with the second melt supply channel 22. The outgoing melt channels 41b are respectively in fluid communication with the annular middle melt channel 24 via a distribution channel 27. In the embodiment shown, the distribution channels 26, 27 have a spiral shape in the axial direction, which allows the respective melts to enter the annular outer or inner melt channels 25, 24 at an inclination with respect to the axial direction, in order to obtain better distribution of the melt (see also FIG. 6).

FIG. 5 shows a detailed sectional view of the integrated back-flow barrier 40. The melt channel 41 traversing the central bore 20 is formed by an incoming melt channel 41a and two outgoing melt channels 41b. These are formed by lateral bores in the rod-shaped or circular cylinder-shaped section 51 of the melt distribution insert 12 which reach right into the central bore 20. The bore in the nozzle body 11 for the second melt supply channel 22 reaches right to the bore for the incoming melt channel 41a. The valve needle 10 with the recess 42 is axially movably accommodated in the central bore 20. The back-flow barrier in FIG. 5 is shown in the open position, and the melt B can pass unhindered through the back-flow barrier.

Furthermore, the separating sleeve 13 and the retaining and sealing sleeve 14 seen in FIG. 3 and FIG. 4, as already described, form the annular middle melt channel 24 and the annular outer melt channel 25 together with the melt distribution insert 12. A conical tip of the rod-shaped section 51 of the melt distribution insert 12 is accommodated herein at a distance from the conical separating sleeve 13. The tip of the conical separating sleeve 13 is accommodated herein, at a distance from the retaining and sealing sleeve 14. The retaining and sealing sleeve 14 has been screwed firmly into the nozzle body 11 and thus holds the separating sleeve 13 in the co-injection nozzle 2. For this purpose, the separating sleeve 13 may be provided with a flange at its upstream end. The melt distribution insert 12 is screwed onto the nozzle body 11 via its flange 50. To clean the co-injection nozzle 2, this can easily be removed from the nozzle holding plate 3 and the mould plate 1 and be broken down into its individual parts.

A particular advantage of the construction of the co-injection nozzle with the melt distribution insert described lies in the fact that the integrated back-flow barrier and the distribution of the two melts within the co-injection nozzle can easily be obtained by a few bores and milled grooves in the melt distribution insert.

In the co-injection nozzle 2 shown in FIGS. 3 and 4, the separating sleeve 13 is provided with an opening 13a the diameter of which corresponds to the diameter of the tapered valve needle 10. In this manner, the valve needle 10 can take a position in which the fluid communication of the annular inner and middle melt channels 23, 24 with the nozzle orifice 30 is interrupted. The opening 13a may also, however, have the same diameter as the lower section 20a of the central bore 20.

Figures 6A, 6B, 6C, 6D:
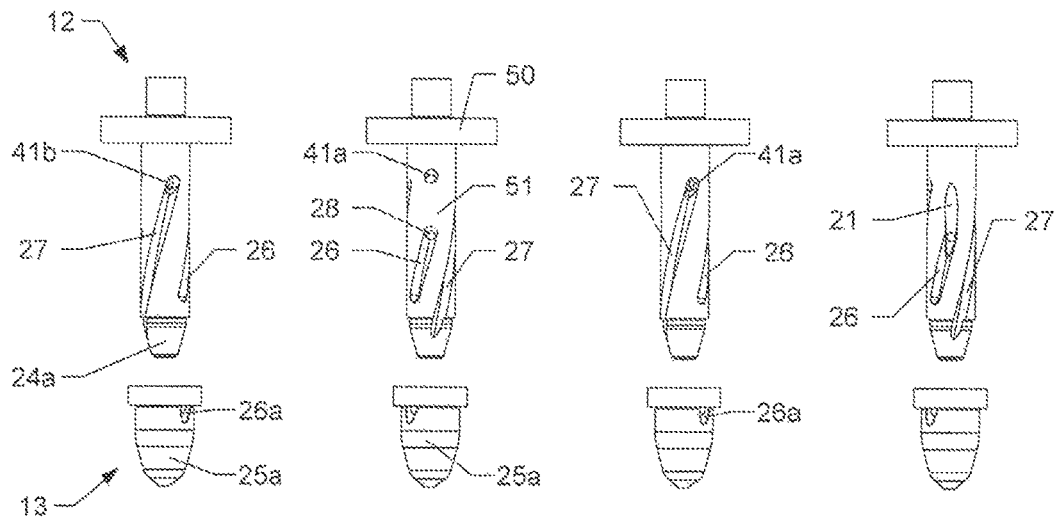
FIGS. 6 (a) to (d) shows four side views of parts of the co-injection nozzle, in an exploded view.
Figures 7A, 7B:
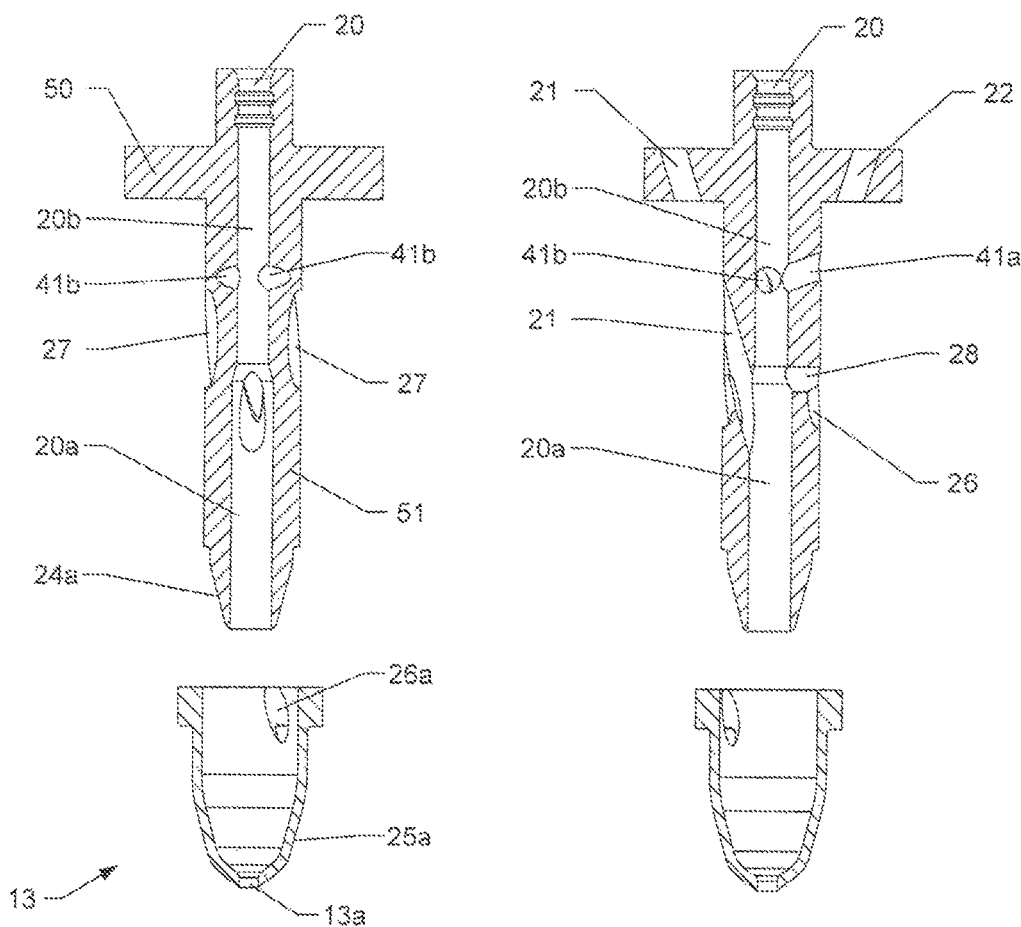
FIGS. 7 (a) and (b) respectively show a sectional view of parts of the co-injection nozzle, in an exploded view.

FIG. 6 shows four side views: FIGS. 6(a) to 6(d) (front, right, back, left) of the melt distribution insert 12 and the separating sleeve 13 in an exploded view, wherein the views are respectively rotated by 90°. FIG. 7(a) (right, see FIG. 6(b)) and FIG. 7(b) (front, see FIG. 6(a)) respectively show a sectional view of the melt distribution insert 12 and the separation sleeve 13 in an exploded view.

The spiral shape of the distribution channels 26, 27 can be seen particularly well in FIG. 6. In the embodiment of the melt distribution insert 12 shown, for the first and the second melts A, B, two distribution channels 26, 27 are respectively formed. The two distribution channels 26 for the first melt A and the two distribution channels 27 for the second melt B alternate and are at a uniform distance from each other around the circumference of the circular cylinder-shaped section 51, allowing for optimized distribution of heat within the co-injection nozzle 2. In similar manner, the distribution channels may also be formed so as to run straight in the axial direction.

The incoming melt channel 41a of the back-flow barrier can be seen in FIG. 6(b). In the central bore 20 of the melt distribution insert 12, the second melt B is divided into two streams which pass through the outgoing melt channels 41b (FIGS. 6(a) and 6(c)) into the respective distribution channels 27.

The first melt supply channel 21 reaches right up to the central bore 20 of the melt distribution insert 12 (FIG. 7(b)). In this region, a portion of the melt A is guided laterally in two distribution channels 26 on the surface of the melt distribution insert 12 and a portion is guided into the annular inner melt channel 23 along the lower section 20a of the central bore 20. The first distribution channel 26 is fed directly through the first melt supply channel 21. A connecting channel 28 connects the second distribution channel 26 to the central bore 20, and thus is supplied with the first melt A.

The distribution channels 27 start upstream of the distribution channels 26 and extend further downstream than the distribution channels 26, into the region of the annular middle melt channel 24 part of which is formed by the surface 4a of the conical tip of the melt distribution insert 12. The distribution channels 26 for the first melt A are thus shorter in length than the distribution channels 27 for the second melt B.

The annular outer melt channel 25 extends in the axial direction further upstream than the annular middle melt channel 24. In this manner, the distribution channel 26 can feed the annular outer melt channel 25 through a bore 26a in the separating sleeve 13 without having to traverse the middle melt channel 24. This bore 26a ends in the outer surface 25a of the separating sleeve 13, which forms part of the annular outer melt channel 25.

In all of the figures, the same reference numerals are used for the same parts.

REFERENCE LIST 1 mould plate
1a mould chamber (cavity)
2 co-injection nozzle
2a half of co-injection nozzle (downstream)
2b half of co-injection nozzle (upstream)
3 nozzle holding plate
4 melt manifold plate
4a bore
5 back plate
6 valve needle actuation device
7 first melt supply line
8 second melt supply line
9 nozzle tip
10 valve needle
11 nozzle body
12 melt distribution insert
13 separating sleeve
14 retaining and sealing sleeve
15 heating element
20 central bore
20a lower section of central bore
20b upper section of central bore
21 first melt supply channel
21a first melt supply opening
22 second melt supply channel
22a second melt supply opening
23 annular inner melt channel
24 annular middle melt channel
25 annular outer melt channel
26 distribution channel for melt A
26a bore
27 distribution channel for melt B
28 connecting channel
30 nozzle orifice
40 back-flow barrier
41 traversing melt channel
41a incoming melt channel
41b outgoing melt channel
42 recess
50 flange
51 rod-shaped/circular cylinder-shaped section
52 central bore of nozzle body
A first melt
B second melt

The invention claimed is:

1. A co-injection nozzle for an injection moulding device for production of multilayer injection moulded products, the co-injection nozzle comprising:
a first melt supply channel for a first melt;
a second melt supply channel for a second melt;
a nozzle body forming a central bore;

an axially movable valve needle accommodated in the central bore to open and close a nozzle orifice;

an annular inner melt channel which is formed in the downstream half of the co-injection nozzle by the central bore and the valve needle and is in fluid communication with the first melt supply channel;

an annular middle melt channel which is in fluid communication with the second melt supply channel and which extends about the annular inner melt channel;

an annular outer melt channel which is in fluid communication with the first melt supply channel and which extends about the annular middle melt channel;

the inner, middle and outer melt channels converging fluidically in the region of the nozzle tip to form a concentrically layered melt stream; and the co-injection nozzle including a back-flow barrier for the second melt, the back-flow barrier integrated into the central bore and formed by a recess in a side surface of the valve needle cooperative with a traversing melt channel portion of the middle melt channel, the needle and the traversing melt channel forming:

an open position of the back-flow barrier when the valve needle recess is aligned with the traversing melt channel thereby forming a gap around the valve needle to enable the second melt to flow within the central bore and past the valve needle, and a closed position of the back-flow barrier when the valve needle recess is not positioned opposite the traversing melt channel;

wherein the traversing melt channel includes an incoming melt channel and at least one outgoing melt channel, the incoming melt channel and the at least one outgoing melt channel in fluid communication through the valve needle recess when the back-flow barrier is in the open position.

2. The co-injection nozzle as claimed in claim 1, wherein the melt channel traversing the central bore places the second melt supply channel in fluid communication with the annular middle channel for the second melt.

3. The co-injection nozzle as claimed in claim 1, wherein the traversing melt channel is formed by a plurality of bores which open into the central bore.

4. The co-injection nozzle as claimed in claim 1, wherein the openings of the incoming melt channel and the at least one outgoing melt channel into the central bore are disposed at approximately the same height in the axial direction.

5. The co-injection nozzle as claimed in claim 1, further comprising
a cylindrical distribution insert insertable into the nozzle body.

6. The co-injection nozzle as claimed in claim 5, wherein the traversing melt channel is located in the cylindrical distribution insert and is formed by at least one through bore or by a plurality of bores opening into the central bore.

7. The co-injection nozzle as claimed in claim 1, wherein the incoming melt channel is in fluid communication with the second melt supply channel and the two outgoing melt channels is in fluid communication with the annular middle melt channel via respective distribution channels.

8. The co-injection nozzle as claimed in claim 7, the co-injection nozzle further including:
a cylindrical melt distribution insert insertable within the nozzle body central bore;
the distribution channels being formed as grooves incorporated into the surface of the melt distribution insert.

9. A co-injection device with at least one co-injection nozzle as claimed in claim 1, wherein the co-injection nozzle is held in a nozzle holder plate and is accommodated with the tip in a recess of a mould plate.

10. The co-injection device as claimed in claim 9, wherein the recess in the mould plate defines a portion of the annular outer melt channel and a nozzle orifice is formed in the mould plate.

11. The co-injection device as claimed in claim 9, wherein the device is provided with a melt manifold plate with a first melt supply line and a second melt supply line, wherein the first melt supply channel is connected to the first melt supply line and the second melt supply channel is connected to the second melt supply line.

12. The co-injection device as claimed in claim 9, wherein the valve needle of the co-injection nozzle extends in a contact-free manner through a bore in a melt manifold plate and is connected to a valve needle actuation device.

* * * * *